(12) United States Patent
Manivannan et al.

(10) Patent No.: US 8,562,159 B2
(45) Date of Patent: Oct. 22, 2013

(54) INSTRUMENT CLUSTER AND METHODS THEREOF

(75) Inventors: Manikesi Manivannan, Tamil Nadu (IN); Rangappan Kanagaraj, Tamil Nadu (IN); Krishnasamy Kanakaraju, Tamil Nadu (IN)

(73) Assignee: Pricol Limited, Colmbatore (IN)

( * ) Notice: Subject to any disclaimer, the term of this patent is extended or adjusted under 35 U.S.C. 154(b) by 509 days.

(21) Appl. No.: 12/811,693

(22) PCT Filed: Jan. 5, 2009

(86) PCT No.: PCT/IN2009/000012
§ 371 (c)(1),
(2), (4) Date: Jul. 2, 2010

(87) PCT Pub. No.: WO2009/084043
PCT Pub. Date: Jul. 9, 2009

(65) Prior Publication Data
US 2010/0284164 A1 Nov. 11, 2010

(30) Foreign Application Priority Data
Jan. 3, 2008 (IN) .................. 00032/CHE/2008

(51) Int. Cl.
*G01D 11/28* (2006.01)

(52) U.S. Cl.
USPC .............. 362/23.21; 362/23.07; 362/23.09; 362/23.11; 362/23.12; 362/23.16; 362/23.18; 362/23.19; 362/511

(58) Field of Classification Search
USPC .................. 362/489, 509–515, 26–30, 628, 362/23.01–23.22
See application file for complete search history.

(56) References Cited

U.S. PATENT DOCUMENTS

| 6,854,350 B2 * | 2/2005 | Ayres ............................ 362/489 |
| 2005/0212721 A1 * | 9/2005 | Kuwahara et al. .............. 345/32 |
| 2006/0219155 A1 * | 10/2006 | Honma et al. ................ 116/288 |
| 2007/0252684 A1 | 11/2007 | Fournier et al. |

FOREIGN PATENT DOCUMENTS

| DE | 298 16 517 U1 | 12/1998 |
| DE | 10 2006 046 405 A1 | 1/2008 |
| GB | 2437548 A | 10/2007 |
| JP | 9184743 A | 7/1997 |
| JP | 1116011 A | 6/1999 |

* cited by examiner

*Primary Examiner* — William Carter
(74) *Attorney, Agent, or Firm* — DLA Piper LLP (US)

(57) ABSTRACT

The present invention relates to an instrument cluster, more particularly relates to an improved instrument cluster having a Printed Circuit Board [PCB (1)] which holds the pointer drive source and an illumination source of pointer. The instant invention also provides for a method of operating the instrument cluster and method of assembling the instrument cluster.

13 Claims, 4 Drawing Sheets

INSTRUMENT CLUSTER AND METHODS THEREOF

CROSS REFERENCE TO RELATED APPLICATION(S)

This application is a 35 USC §371 National Stage application of International Application No. PCT/IN2009/000012 filed Jan. 5, 2009, now pending; which claims the benefit under 35 USC §119(a) to India Patent Application No. 00032/CHE/2008 filed Jan. 3, 2008. The disclosure of each of the prior applications is considered part of and is incorporated by reference in the disclosure of this application.

FIELD OF THE INVENTION

The present invention relates to an instrument cluster, more particularly relates to an improved instrument cluster having a Printed Circuit Board (PCB) which holds the pointer drive source and an illumination source of pointer. The instrument finds its potential application in automobile industry.

BACKGROUND OF THE INVENTION AND PRIOR ARTS

The instrument clusters mainly comprised of pointers to indicate the speed or RPM of an engine and fuel level on an index plate/dial. Normally the pointer moves with respect to dial center from position '0' to maximum position of the dial. During the pointer rotation, pointer may produce shadow on the dial. Further the shadow may lead to poor aesthetic look and may also disturb the user.

Figure 1:
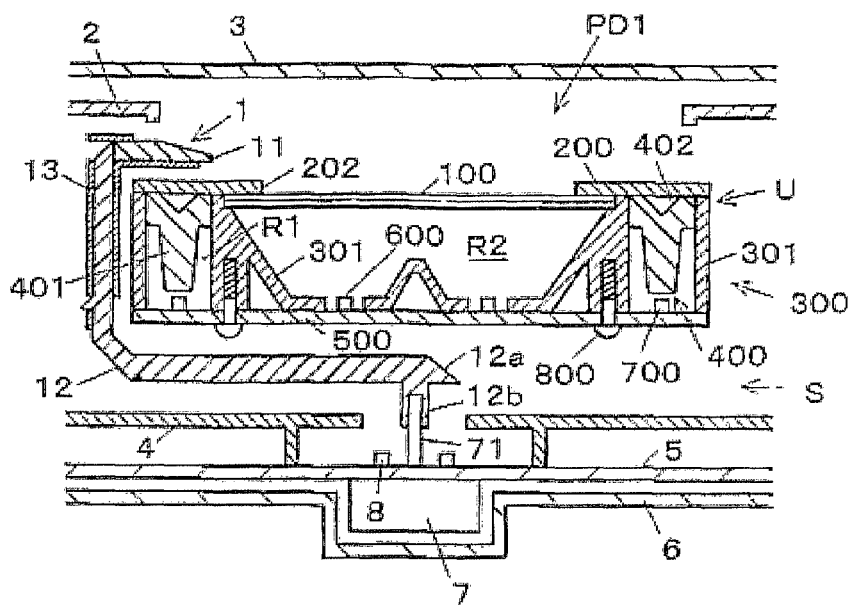

FIG. 1 provides for known art of pointer indication method which contains the following components for indicating speed or RPM of the vehicles
  pointer (11)
  PCB bottom and top (5 and 500)
  stepper motor/drive source (7)
  indication panel (100)
  indication plate (200)
  index parts (201)
  light source for illuminating the indication panel (100), and
  frame (300)
The limitations in the existing method of pointer indication are;
  The product construction requires at least two PCB (Top and Bottom), wherein the bottom PCB is for holding stepper motor (7) and the top PCB is for light source assembly (Light Emitting Diode),
  New connector is also required to connect said two PCB's.
  Geometry of the pointer leads to difficulty in assembling the PCB assembly into the instrument cluster,
  An additional frame is used for holding the two each other indication panel, indication plate and the light source,
  The product construction requires more spaces for accommodating the both electronics and mechanical components. This is not suitable for very compact design of instrument clusters,
  Additional component No. 3 is used for pointer illumination,
  Additional component No. 4 is used for holding the PCB, and
  Geometry of the pointer may produce warp.
The aforesaid disadvantages of the related art in-turn increase the cost and require more space of the instrument cluster.

OBJECTS OF THE INVENTION

The principal object of the invention is to develop an instrument cluster having one PCB.
Still another object of the instant invention is to provide for a method of operating the instrument cluster.
Yet another object of the instant invention is to provide for a method of assembling of the instrument cluster.

STATEMENT OF THE INVENTION

Accordingly, the instant invention provides for an instrument cluster comprising; a Printed Circuit Board [PCB] assembly comprising a drive source connected to the PCB (1) and is mounted in such a way that, stem of the drive source faces towards bottom side of the PCB (1) and pointer is pressed from the bottom side of the PCB (1) for driving a top pointer, a light guide (6) mounted above the PCB (1) comprising a light source and a reflector (3) mounted above the light source, a pointer characterized into a bottom pointer (4) and a top pointer (5), wherein said bottom pointer (4) is connected the drive source and said top pointer (5) is connected to the bottom pointer (4), and case assembly (13) for supporting the PCB assembly, the instant invention also provides for a method of operating instrument cluster, said method comprising acts of rotating shaft of drive source to rotate pointer, and illuminating the pointer by a light source mounted onto Printed Circuit Board [PCB (1)] for dial (7) indication, wherein said pointer picks the light from reflector (3) all around its sweep angle; and the instant invention also provides for a method of assembling an instrument cluster, said method comprising acts of assembling of Printed Circuit Board [PCB (1)] comprising acts of connecting drive source to Printed Circuit Board [PCB (1)] in such a way that, stem of the drive source faces towards bottom side of the PCB (1) and pointer is pressed from the bottom side of the PCB (1) for driving a top pointer, mounting a light guide (6) comprising a light source and a reflector (3) on top of the PCB (1), connecting pointer with the drive source, wherein said pointer is characterized into a bottom pointer (4) and top pointer (5), and mounting a case assembly (13) below the PCB assembly for supporting the PCB assembly.

BRIEF DESCRIPTION OF THE ACCOMPANYING DRAWINGS

Figure 3:
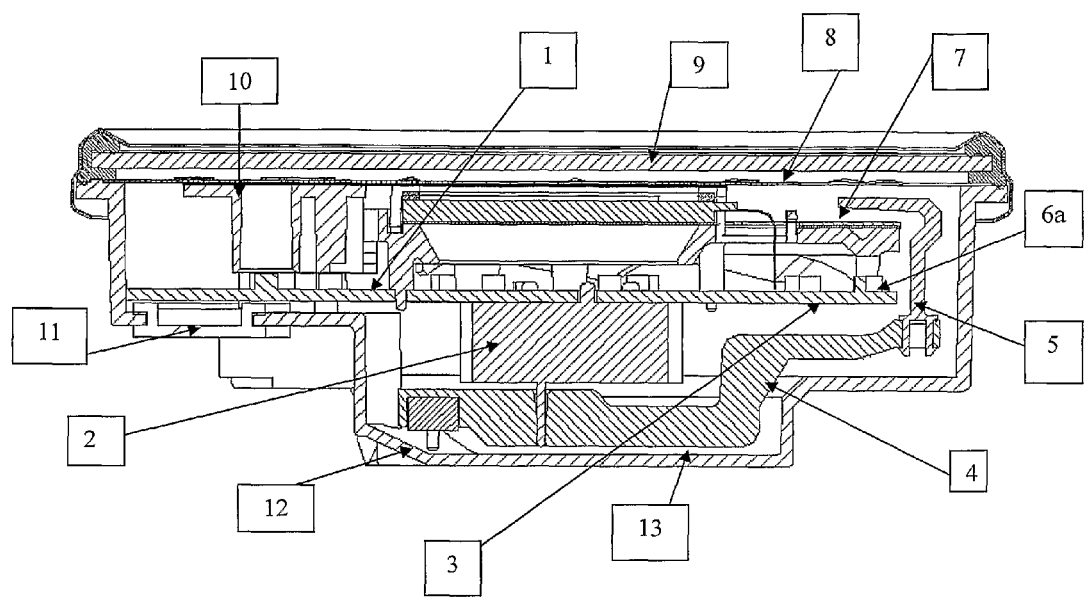
Figure 4:
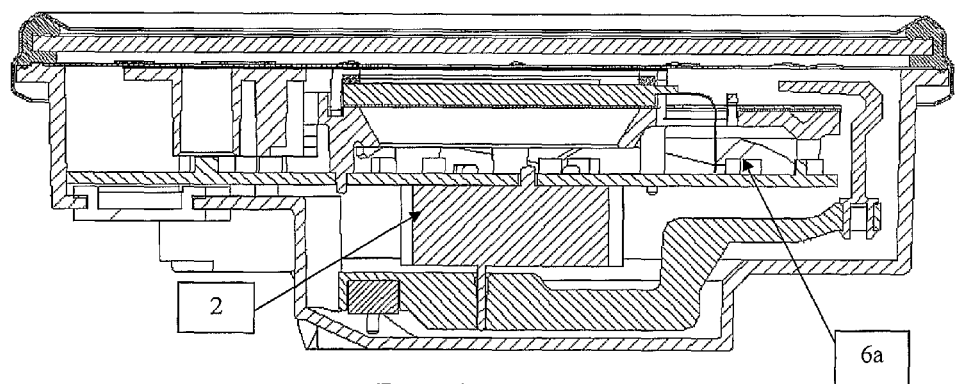
Figure 5:
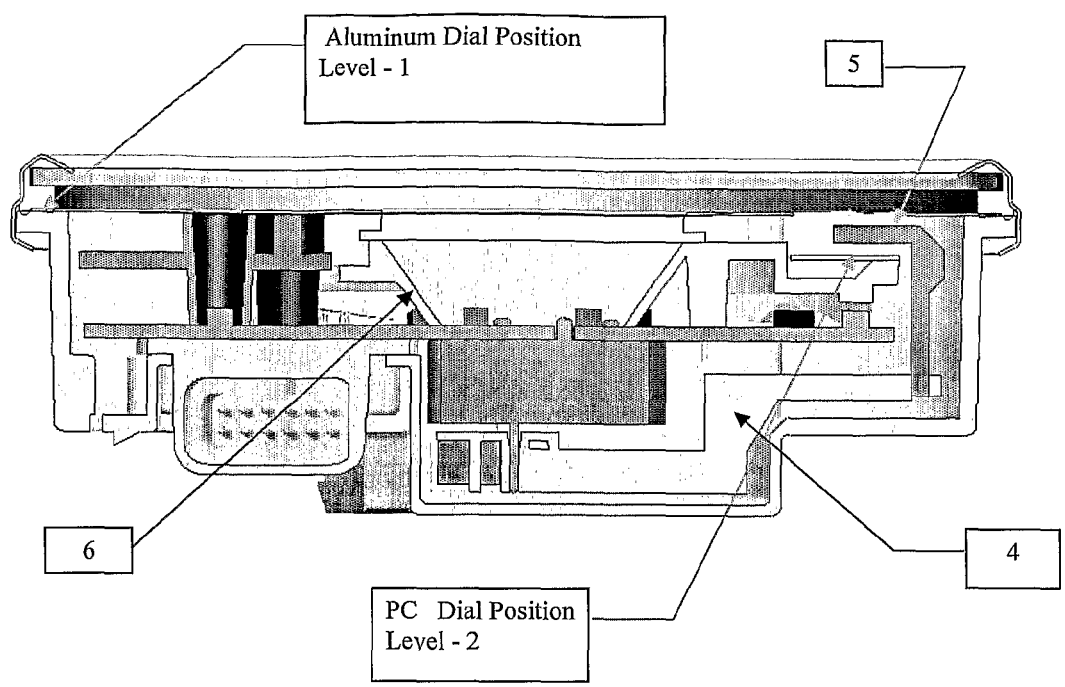

The preferred embodiments of the invention will hereinafter be described in conjunction with the appended drawings provided to illustrate and not to limit the invention, in which
  FIGS. 1 and 2: shows existing pointer indication method.
  FIGS. 3 and 4: shows proposed pointer indication method in instrument cluster for automobile applications.
  FIG. 5 shows layout of the Instrument cluster
  FIG. 6a: shows the front view of the assembly printed circuit board (PCB) having the diffuser sheet (14).
  FIG. 6b: shows the cross sectional view of the assembly printed circuit board (PCB) having the diffuser sheet (14).

DETAILED DESCRIPTION OF THE INVENTION

The present invention is in relation to an instrument cluster comprising; a Printed Circuit Board (PCB) assembly comprising a drive source connected to the PCB (1) and is mounted in such a way that, stem of the drive source faces towards bottom side of the PCB (1) and pointer is pressed from the bottom side of the PCB (1) for driving a top pointer, a light guide (6) mounted above the PCB (1) comprising a light source and a reflector (3) mounted above the light source, a pointer characterized into a bottom pointer (4) and a top pointer (5), wherein said bottom pointer (4) is connected to the drive source and said top pointer (5) is connected to the bottom pointer (4), and case assembly (13) mounted below the PCB assembly for supporting the PCB assembly.

In still another embodiment of the present invention the PCB assembly is having predetermined geometric shape, preferably flat.

In yet another embodiment of the present invention the drive source is preferably a stepper motor (2) which is mounted below the PCB (1).

In still another embodiment of the present invention the light source is preferably a Liquid Emitting Diode (LED) and is mounted at the periphery.

In still another embodiment of the present invention the LED is assembled with a diffuser sheet (14) to diffuse the light all around the LED surface evenly.

In still another embodiment of the present invention said light guide (6) comprises a warning compartment (10) to indicate the warning signals.

In still another embodiment of the present invention said case assembly (13) comprises of a grommet (11) at its peripheral end to prevent entry of dust and water inside the instrument cluster.

In still another embodiment of the present invention said bottom pointer (4) and top pointer (5) are connected using snap fit.

In still another embodiment of the present invention said dial (7), the diffuser sheet (14) and LED Holder are assembled to Light Guide (6) using screws and guide pinch of the light guide.

In still another embodiment of the present invention the bottom pointer (4) is connected with a counter weight (12) at its other end to balance with respect to its rotating axis.

In still another embodiment of the present invention the case assembly (13) is connected with a PCB assembly by using overhanging support element along with screw and guiding pinch.

In still another embodiment of the present invention said instrument cluster is attached with symbol sheet at the warning compartment (10) to glow warning symbols with color code indication.

In still another embodiment of the present invention said instrument cluster is attached with an aluminum dial (8) to indicate the dial (7) major divisions.

The present invention is in relation to a method of operating instrument cluster, said method comprising acts of; rotating shaft of drive source to rotate pointer, illuminating the pointer by a light source mounted onto Printed Circuit Board [PCB (1)] for dial (7) indication, wherein said pointer picks the light from reflector (3) all around its sweep angle.

In still another embodiment of the present invention said rotation of pointer indicates the reading of speed/RPM of an engine.

In still another embodiment of the present invention said illuminating of the pointer is carried-out by light source of Liquid Emitting Diode and by a reflector (3).

In still another embodiment of the present invention said pointer is rotated at periphery of the dial (7).

The present invention is in relation to a method of assembling an instrument cluster, said method comprising acts of assembling of Printed Circuit Board [PCB (1)] comprising acts of connecting drive source to Printed Circuit Board [PCB (1)] in such a way that, stem of the drive source faces towards bottom side of the PCB (1) and pointer is pressed from the bottom side of the PCB (1) for driving a top pointer, mounting a light guide (6) comprising a light source and a reflector on top of the PCB (1), connecting pointer with the drive source, wherein said pointer is characterized into a bottom pointer (4) and a top pointer (5) and mounting a case assembly (13) below the PCB assembly for supporting the PCB assembly.

The pointers are mainly used in instrument cluster to indicate the speed or RPM of an Engine and Fuel level on an index plate/dial. Normally the pointer moves from 0 position to maximum position with respect to dial center. During the Pointer rotation, pointer may produce some shadow on the dial. This shadow produces poor aesthetic and disturbs the rider. But in case of the instant invention the pointer moves on the periphery of the index plate/dial with respect to dial center to overcome the problem of shadow on the dial.

Referring to FIGS. 3 to 5, in PCB Assembly the front mount stepper motor (2) assembled in bottom side of the PCB (1) by using solder process. The PCB (1) is designed with pigtail wiring harness along with Grommet (11) and the grommet (11) is assembled with outer case during the final assembly to arrest the water and dust to the instrument cluster. Also the PCB assembly having the light guide and the same mounted in PCB (1) by using screw along with two guide pinches.

Figure 6A:
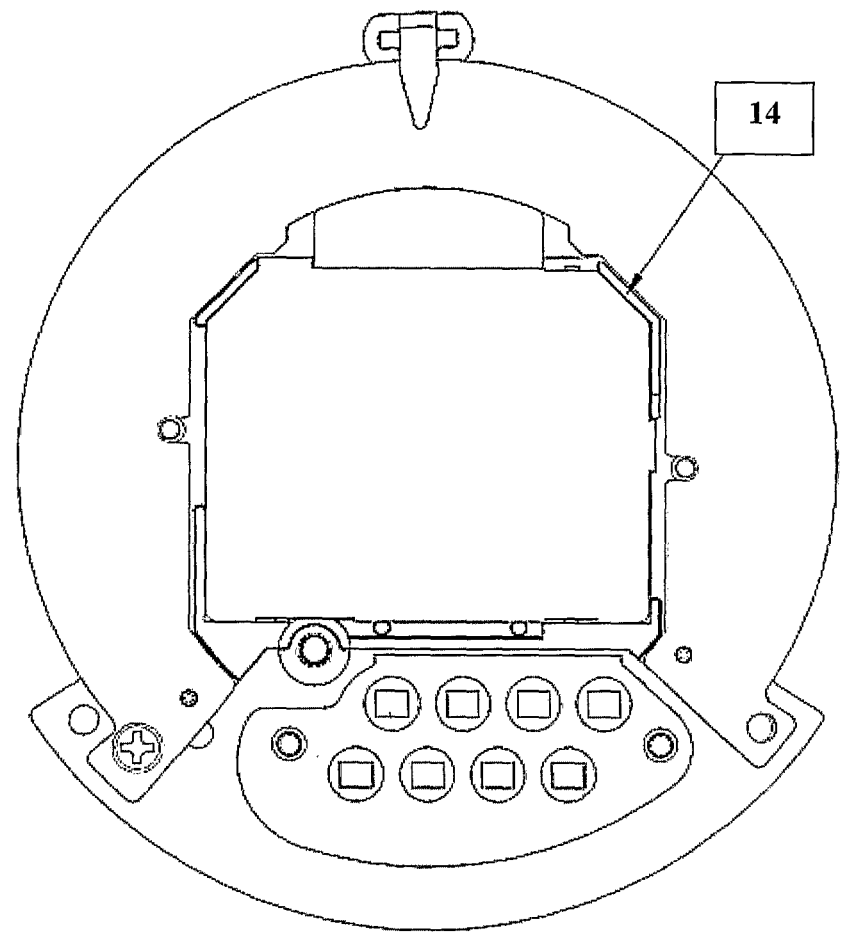
Figure 6B:
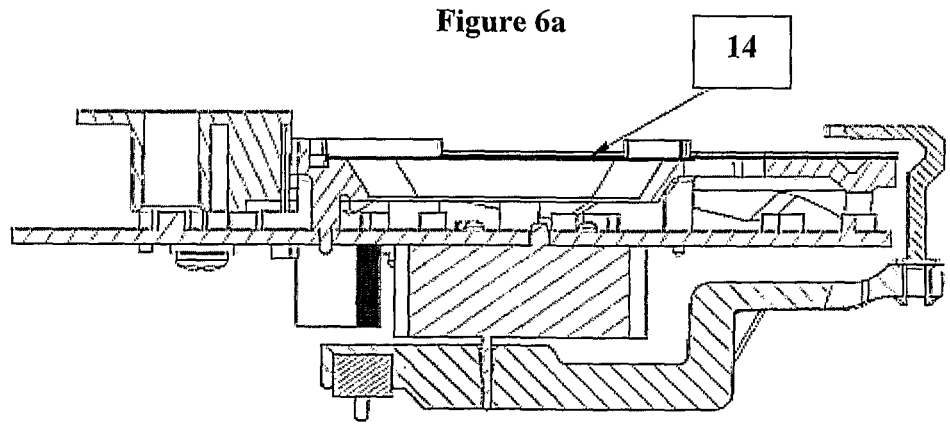

Followed by the Light guide, the Liquid Emitting Diode (LED) is assembled along with diffuser sheet (14) (as shown in FIG. 6a and FIG. 6b) to diffuse the light all around the LED surface evenly. After the assembly of LED, the outer dial and its diffuser are assembled along with LED holder by using screws and one guiding pinch.

A warning compartment (10) is also assembled with PCB (1) by using screws and guiding element.

Both the pointer and stepper motor (2) are in PCB Assembly. The stepper motor (2) is assembled in PCB (front mount) in such a way that, stem of the stepper motor (2) focusing towards bottom side of the PCB (1) and the pointer bottom is pressed from the bottom side of the PCB (1). The counter weight (12) attached with bottom pointer by insert plastic molding process to making the pointer balance with respect to its rotating axis.

Finally in PCB assembly, the top pointer is assembled with bottom pointer by using snap fit.

Case Assembly

The outer case has a provision to fit the instrument cluster on a vehicle and also has a provision to assemble with the grommet (11).

The PCB assembly is assembled with outer case by using overhanging support element along with screw and guiding pinch. Then the symbol sheet is pasted on the warning compartment (10) to glow the warning symbol along with color code indication. The Spun aluminum dial is also mounted/affixed on the symbol sheet with gun profile and spun finish to indicate the dial major divisions.

Finally a glass (9) is assembled along with front ring (by rolling process) to give the better visibility to the driver as well as arrest the water, moisture and dust entry into the instrument cluster.

Advantages in proposed new method:
The product construction needs only one PCB (1) for holding the pointer drive source and illumination sources of the pointer
Since the pointer is divided into two parts and geometry of the pointer also ensure that easy assembly process
Front mount stepper motor (2) used (Upside Down) below the PCB (1) in order to avoid the many no of PCB (1) and easy function of the Pointer
No frame used Even though the size of the instrument cluster is very small and the product construction provides for more spaces for accommodating the both electronics and mechanical components. This is suitable for very compact design instrument cluster.

Geometry of the pointer does not produce any warp edges in the components and easy for tooling process.

The pointer designed in such a way that it can pick the light from the Reflector (3) all around its sweep angle.

No additional components are used to hold PCB (1)

No additional components are used for the illumination

The above advantages in-turn increases quality and decrease the cost of the product of instrument cluster.

Instant invention involves only one PCB (1) used by using the front mount stepper motor (2) or pointer drive source mounted at bottom side of the PCB (1) by assembling upside down condition.

Both the pointer and stepper motor (2) come in PCB Assembly, the stepper motor (2) assembled in PCB (1) (Front mount) in such a way that stem will focus towards Bottom side of the PCB (1) and the bottom pointer will be pressed from the Bottom side of the PCB (1). The Counter weight (12) attached with bottom pointer by insert plastic molding process to making the pointer balance with respect to its rotating axis.

The light source for the pointer and dial numerals are also placed on the top side of the same PCB (1) along with its supportive parts.

Figure 2:
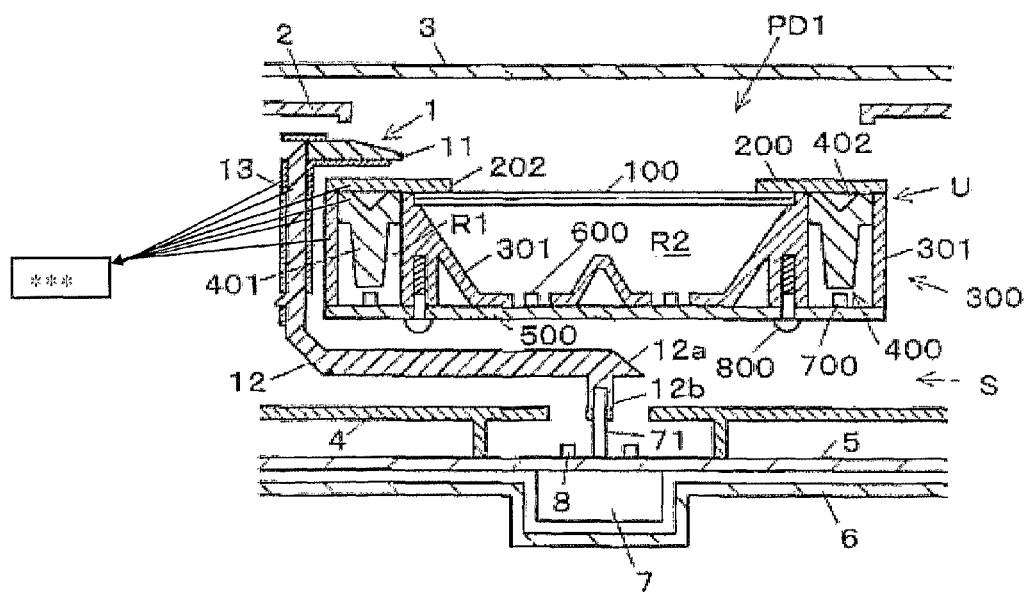

Steps Followed to Reduce the Components which are Used for Holding the PCB (1) (FIG. 2).

The pointer designed in such a way that it can pick the light from the light source around its sweep angle help of the below indicated components (***).

Component No. 4 is used for holding the PCB.

In case of proposed method only one component used that is reflector (3) to illuminate the pointer all around its Sweep, whereas five components were used in the existing method (FIG. 2 with *** indication) and no separate component is used to hold the PCB.

REFERRAL NUMERALS

PCB: 1
Stepper motor: 2
Reflector: 3
Bottom pointer: 4
Top Pointer: 5
Light Guide: 6
Lighting Source (LED): 6a
Dial: 7
Al. Dial: 8
Glass: 9
Warning Compartment: 10
Grommet: 11
Counter weight: 12
Case Assembly: 13
Diffuser Sheet: 14

The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of this invention. The technology of the instant Application explained with the examples should not be construed to limit the scope of the invention.

We claim:

1. An instrument cluster comprising:
   a Printed Circuit Board (PCB) assembly (1) comprising:
      a drive source connected to the PCB assembly (1) and is mounted in such a way that, stem of the drive source faces towards bottom side of the PCB assembly (1) for driving a pointer, wherein the pointer is characterized into:
         a bottom pointer (4) which is connected to the drive source at one end and to a counter weight (12) at its other end to balance with respect to its rotating axis; and
         a top pointer (5) connected to the bottom pointer (4);
      a light guide (6) mounted above the PCB assembly (1) comprising a light source assembled with a diffuser sheet (14) and a reflector (3) mounted above the light source, wherein the diffuser sheet (14) and a dial (7) of the instrument cluster are assembled to the light guide (6) using screws and guide pinches of the light guide (6), wherein the light source illuminates the reflector and the top pointer picks light from the reflector all around its sweep angle and rotates on a dial (7) of the instrument cluster at peripheral way for dial indication; and
   a case assembly (13) for supporting the PCB assembly (1).

2. The instrument cluster as claimed in claim 1, wherein the drive source is a stepper motor (2) and is mounted below the PCB assembly (1).

3. The instrument cluster as claimed in claim 1, wherein the light source is a Light Emitting Diode (LED) and is mounted at periphery of the PCB assembly (1).

4. The instrument cluster as claimed in claim 3, wherein the LED is assembled with the diffuser sheet (14) to diffuse light from the light source all around surface of the LED evenly.

5. The instrument cluster as claimed in claim 1, wherein the light guide (6) comprises a warning compartment (10) to indicate warning signals.

6. The instrument cluster as claimed in claim 1, wherein the case assembly (13) comprises a grommet (11) at its peripheral end to prevent entry of dust and water inside the instrument cluster.

7. The instrument cluster as claimed in claim 1, wherein the case assembly (13) is connected to the PCB assembly (1) by using overhanging support element along with the screws and guiding pinches.

8. The instrument cluster as claimed in claim 1 is attached with a symbol sheet at a warning compartment (10) to glow warning symbols with color code indication.

9. The instrument cluster as claimed in claim 1 is attached with an aluminum dial (8) to indicate major divisions of the dial (7).

10. A method of operating an instrument cluster as claimed in claim 1, the method comprising;
    rotating shaft of a drive source connected to a PCB assembly (1) of the instrument cluster to rotate a top pointer (5); and
    illuminating the top pointer (5) by a light source mounted onto the PCB assembly (1) for dial (7) indication, wherein the top pointer picks light from a reflector (3) mounted above the light source all around its sweep angle and rotates on the dial at peripheral way for dial indication.

11. The method as claimed in claim 10, wherein illuminating the top pointer (5) is carried-out by the light source of Light Emitting Diode and by the reflector (3).

12. The method as claimed in claim 10, wherein the top pointer (5) is rotated at periphery of the dial (7) to indicate reading of vehicle speed/RPM of an engine.

13. A method of assembling an instrument cluster, the method comprising;

assembling of a Printed Circuit Board (PCB) comprising:
connecting a drive source to the PCB assembly (1) in such a way that, stem of the drive source faces towards bottom side of the PCB (1) for driving a pointer;
wherein the pointer is characterized as a top pointer and a bottom pointer;
connecting one end of the bottom pointer (4) to the drive source and other end of the bottom pointer to a counter weight (12) to balance with respect to its rotating axis; and
connecting the top pointer (5) to the bottom pointer (4) using a snap fit;
mounting a light guide (6) above the PCB assembly (1) wherein the light guide comprises of a light source assembled with a diffuser sheet and a reflector (3) mounted above the light source, wherein the diffuser sheet (14) and a dial (7) of the instrument cluster are assembled to the light guide (6) using screws and guide pinches of the light guide (6), wherein the light source illuminates the reflector and the top pointer picks light from the reflector all around its sweep rotates on a dial (7) of the instrument cluster at peripheral way for dial indication; and mounting a case assembly below the PCB assembly (1) for supporting the PCB assembly (1).

\* \* \* \* \*